(12) United States Patent
Wu

(10) Patent No.: US 10,889,006 B2
(45) Date of Patent: Jan. 12, 2021

(54) SUCTION DEVICE, SUCTION SYSTEM AND HANDLING EQUIPMENT

(71) Applicants: HKC CORPORATION LIMITED, Shenzhen (CN); CHONGQING HKC OPTOELECTRONICS TECHNOLOGY CO., LTD., Chongqing (CN)

(72) Inventor: Wei Wu, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 99 days.

(21) Appl. No.: 15/745,064

(22) PCT Filed: Dec. 26, 2017

(86) PCT No.: PCT/CN2017/118649
§ 371 (c)(1),
(2) Date: Dec. 14, 2018

(87) PCT Pub. No.: WO2019/080347
PCT Pub. Date: May 2, 2019

(65) Prior Publication Data
US 2019/0118391 A1    Apr. 25, 2019

(30) Foreign Application Priority Data
Oct. 24, 2017   (CN) .................... 2017 2 1380966 U

(51) Int. Cl.
*B25J 15/06*     (2006.01)
*B25J 15/00*     (2006.01)

(52) U.S. Cl.
CPC ....... *B25J 15/0616* (2013.01); *B25J 15/0061* (2013.01)

(58) Field of Classification Search
CPC .... B25J 15/0683; B25J 15/0691; B25J 15/06; B25J 15/0616; B25J 15/0061;
(Continued)

(56) References Cited

U.S. PATENT DOCUMENTS 5,609,377 A * 3/1997 Tanaka ................. B65G 47/918
294/65
6,068,317 A * 5/2000 Park ........................ H01L 21/68
294/87.1

(Continued)

FOREIGN PATENT DOCUMENTS

CN      204823238 U    12/2015
CN      205526648 U     8/2016
(Continued)

OTHER PUBLICATIONS

International Search Report and Written Opinion in corresponding PCT Application No. PCT/CN2017/118649, dated Jul. 9, 2018.

*Primary Examiner* — Stephen A Vu
(74) *Attorney, Agent, or Firm* — Westbridge IP LLC

(57) ABSTRACT

A suction device includes a base having a first end surface, at least three suction nozzles and a driving assembly. The at least three suction nozzles are disposed on the first end surface. A load bearing region is defined by the at least three suction nozzles. The driving assembly is configured to adjust the area of the load bearing region. The driving assembly is fixed to the base.

17 Claims, 9 Drawing Sheets

(58) Field of Classification Search
CPC .. B65G 47/918; B65G 49/061; B66C 1/0237; B66C 1/0243; B66C 1/0281
USPC .............. 294/188, 65, 87.1; 414/752.1
See application file for complete search history.

(56) References Cited

U.S. PATENT DOCUMENTS

| | | | |
|---|---|---|---|
| 7,611,180 | B1 | 11/2009 | Fisher et al. |
| 8,025,277 | B2* | 9/2011 | Lin ................. B25J 15/0061 269/21 |
| 9,493,316 | B2* | 11/2016 | Girtman .............. B25J 15/0052 |
| 10,099,385 | B2* | 10/2018 | Petrovski ............. B25J 15/0052 |
| 2008/0187428 | A1 | 8/2008 | Murry |
| 2010/0074720 | A1* | 3/2010 | Taylor ................. B25J 15/0616 414/412 |
| 2014/0199153 | A1* | 7/2014 | Reinhold ............. B65H 3/0816 414/800 |

FOREIGN PATENT DOCUMENTS

| | | |
|---|---|---|
| CN | 205889228 U | 1/2017 |
| CN | 205972954 U | 2/2017 |
| CN | 106516774 A | 3/2017 |
| CN | 206123626 U | 4/2017 |
| CN | 206187997 U | 5/2017 |
| CN | 206782820 U | 12/2017 |
| WO | 2008130256 A1 | 10/2008 |

* cited by examiner

SUCTION DEVICE, SUCTION SYSTEM AND HANDLING EQUIPMENT

TECHNICAL FIELD

The present application relates to the technical field of handling equipment, and more particularly relates to a suction device, a suction system and a handling equipment.

BACKGROUND

In all walks of life in modern society, the processing of the substrate involves various fields, including glass plates, metal, plates and so on. And more particularly in the field of display technology, there are many applications of the glass substrate. In the process of manufacturing the substrate, the glass substrate needs to be moved in different positions. In general, a handling equipment for handling a substrate is provided with suction nozzles for sucking the substrate, and the substrate is transported while the substrate is sucked by the suction nozzles. Before moving the substrate, the substrate may be offset due to various reasons or the substrate is notched due to collision and breakage. When the suction nozzles of the handling equipment are not sucked to the substrate or sucked on the notch, there may be a problem that the substrate cannot be sucked, sometimes it will cause the handling equipment to stop running and result in an error, greatly affecting the production efficiency.

SUMMARY OF THE APPLICATION

One object of the present application is to provide a suction device, a suction system and a handling equipment in order to solve the technical problem that the suction nozzles of the suction device cannot be sucked to the substrate due to the displacement or offset of the substrate when the suction device is configured to suck the substrate.

In order to achieve the above object, one technical solution adopted by the present application is to provide a suction device,
which comprises:
a base having a first end surface;
at least three suction nozzles disposed on the first end surface, wherein a load bearing region is defined by the at least three suction nozzles;
a driving assembly configured to adjust the area of the load bearing region, wherein the driving assembly is fixed to the base.

In one embodiment, the number of the suction nozzles is four, and the load bearing region surrounded by the four suction nozzles is rectangular.

In another embodiment, the suction device further comprises:
an air suction device;
a suction tube for transmitting gas to the air suction device, inlet hole being disposed on the suction nozzles, and the suction tube being in communication with the inlet hole.

In one embodiment, the suction nozzles are respectively provided with suction cups.

In one embodiment, one end of the suction cup is recessed inward to form a first chamber, and the inlet hole is in communication with the first chamber.

In one embodiment, a side wall of the first chamber is provided with a vent hole, and the vent hole is in communication with the inlet hole.

In one embodiment, the inside surface of the first chamber is spherical.

In one embodiment, the first end surface is provided with a groove, the groove is provided with a first wall, a second wall opposite to the first wall, and a bottom connecting the first wall with the second wall; the first wall extends toward the inner side of the groove and forms a first extension, the second wall extends toward the inner side of the groove and forms a second extension, a slot is formed between the first extension and the second extension, and the extending direction of the slot is the same as the extending direction of the groove;
a second chamber is defined by the groove, the first extension and the second extension;
the suction nozzle is provided with a fixing plate adapted to the slot, a sliding block is provided in the second chamber and configured to slide along the groove, and the fixing plate is arranged to pass through the slot and in fixed connection with the sliding block.

In one embodiment, the thickness of the fixing plate is the same as the width of the slot.

In one embodiment, the cross section of the second chamber is rectangular.

In one embodiment, balls are disposed between the sliding block and the inner wall of the groove.

In one embodiment, there are a plurality of balls, and the plurality of balls are evenly distributed between the sliding block and the bottom.

In one embodiment, the driving assembly is a double-acting cylinder with double pistons, the double-acting cylinder is provided with a first telescopic end and a second telescopic end which are configured to extend and telescope independently or synchronously, the first telescopic end is provided with one of the suction nozzles and/or the second telescopic end is provided with one of the suction nozzles.

In one embodiment, the suction device further comprises a return spring, one end of the return spring is in fixed connection with the suction nozzle, and the other end of the return spring is fixed to the base.

In one embodiment, the driving assembly is disposed in the extending direction of the return spring.

In one embodiment, the suction device further comprises a first pulling wire for pulling the suction nozzle, the base defines an opening, a first end surface of an edge of the opening is provided with fixed pulley devices configured to change the pulling directions of first pulling wires, wherein the number of the fixed pulley devices corresponds to the number of the suction nozzles; each fixed pulley device comprises a support fixed to the first end surface and a pulley fixed to the support and rotatably connected to the support, and the pulley is provided with a wire slot for accommodating the pulling wire; and
a unidirectional cylinder which is fixed to a second end surface of the base, the second end surface is opposite to the first end surface, the unidirectional cylinder is provided with a third telescopic end extending toward the first end surface, the third telescopic end is arranged to pass through the opening, and the distance between the third telescopic end in an extended state and the first end surface is less than the distance between the pulley and the first end surface;
one end of the first pulling wire is in fixed connection with the suction nozzle, the other end of the first pulling wire is in fixed connection with the third telescopic end, the first pulling wire is engaged in the wire slot, and the first pulling wire is slidingly connected with the pulley.

In one embodiment, the suction device further comprises a second pulling wire, wherein an electric motor is fixed to the first end surface in the load hearing region, and the electric motor is provided with a rotating shaft extending toward outside of the first end surface, the rotating shaft is perpendicular to the first end surface, one end of the second pulling wire is in fixed connection with the suction nozzle, and the other end of the second pulling wire is in fixed connection with the surface of the rotating shaft.

In one embodiment, the second pulling wire is parallel to the first end surface.

The suction device provided by the present application has the following effects: the first end surface of the suction device of the present application is provided with suction nozzles, which are movably connected to the first end surface. The number of the suction nozzles is not less than three, a load bearing region is defined by the suction nozzles, and the suction nozzles may adjust the area of the load bearing region under the driving of the driving assembly. In this way, when the substrate to be sucked generates a displacement or offset resulting in that the suction nozzles cannot be sucked, the suction nozzles can be moved to a new position to suck the substrate.

The present application also provides a suction system, which comprises a robotic manipulator and the suction device, wherein the robotic manipulator is provided with a gripper for gripping an object, and base is fixed to the gripper.

The suction system provided by the present application has the following effects: since the aforementioned suction device is adopted, the first end surface of the suction device of the present application is provided with suction nozzles, which are movably connected to the first end surface. The number of the suction nozzles is not less than three, a load bearing region is defined by the suction nozzles, and the suction nozzles may adjust the area of the load bearing region under the driving of the driving assembly. In this way, when the substrate to be sucked generates a displacement or offset resulting in that the suction nozzles cannot be sucked to the substrate, the suction nozzles can be moved to a new position to suck the substrate.

The present application also provides a handling equipment, which comprises a guide rail, a mover slidingly disposed to the guide rail and a suction system, wherein the robotic manipulator is fixed to the mover.

The handling equipment provided by the present application has the following effects: since the aforementioned suction system is adopted, the first end surface of the suction device of the present application is provided with suction nozzles, which are movably connected to the first end surface. The number of the suction nozzles is not less than three, a load bearing region is defined by the suction nozzles, and the suction nozzles may adjust the area of the load bearing region under the driving of the driving assembly. In this way, when the substrate to be sucked generates a displacement or offset resulting in that the suction nozzles cannot be sucked, the suction nozzles can be moved to a new position to suck the substrate.

BRIEF DESCRIPTION OF THE DRAWINGS

In order to make the technical solutions in the embodiments of the present application clearer, the accompanying drawings to be used in the embodiments and the description of the prior art will be briefly introduced below, it is apparent that the drawings in the following description are merely some embodiments of the present application and that other drawings may be obtained by those skilled in the field without departing from the inventive nature of the invention.

DETAILED DESCRIPTION OF THE EMBODIMENTS

Figure 1:
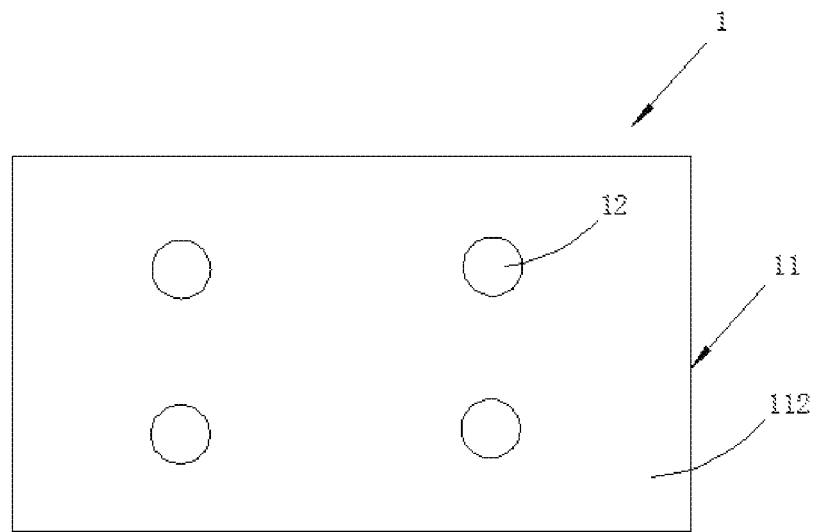
FIG. 1 is a first schematic front view of a suction device according to an embodiment of the present application.

In order to make the technical problems to be solved, technical solutions, and beneficial effects of the present application clearer and more understandable, the present application will be further described in detail hereinafter with reference to the accompanying drawings and embodiments. It should be understood that the embodiments described herein are only intended to illustrate but not to limit the present application.

It is noted that when a component is referred to as being "fixed to" or "disposed on" another component, it can be directly or indirectly on the other component. When a component is referred to as being "connected to" another component, it can be directly or indirectly connected to the other component.

It should be understood that, "length", "width", "upper", "lower", "front", "back", "left" and "right", "vertical", "horizontal", "top", "bottom", "inside", "outside" and other terms indicating the orientation or positional relationship are based on orientation or positional relationship shown in the drawings, only for the purpose of facilitating the description of the application and simplifying the description, instead of indicating or implying that the indicated device or component must have a specific orientation and constructed and operated in a particular orientation, and therefore it cannot be construed as limiting the application.

In addition, the terms "first" and "second" are for illustrative purposes only and should not be construed as indicating or implying a relative importance or implicitly indicating the quantity of technical features indicated. Therefore, a feature that defines "first" and "second" may expressly or implicitly include one or more of the features. In the description of the present application, "multiple" means two or more than two, unless otherwise specifically defined.

Please refer to FIG. 1 to FIG. 4, FIG. 8, FIG. 9 and FIG. 16, the suction device 1 provided by the present application will be described. A suction device 1, which comprises:

a base 11 having a first end surface 112;

at least three suction nozzles 12 disposed on the first end surface 112, wherein a load bearing region is defined by the at least three suction nozzles 12;

a driving assembly (not shown) configured to adjust the area of the load bearing region, wherein the driving assembly is fixed to the base 11.

The first end surface 112 is provided with suction nozzles 12 which are movably connected to the first end surface 112. The number of the suction nozzles 12 is not less than three, the load bearing region is defined by the suction nozzles 12, and the suction nozzles 12 may adjust the area of the load bearing region under the driving of the driving assembly. In this way, when the substrate to be sucked generates a displacement or offset resulting in that the suction nozzles 12 cannot be sucked to the substrate (not shown), the suction nozzles 12 can be moved to a new position to suck the substrate.

The suction nozzles 12 are configured to suck the substrate.

Optionally, the first end surface 112 is a flat surface. Of course, in other embodiments, the first end surface 112 may also be a curved surface or other shapes, provided the movement of the suction nozzles 12 is not affected and the suction nozzles 12 can normally suck the substrate, which is not limited herein.

Optionally, please refer to FIG. 1 to FIG. 4, FIG. 8, FIG. 9 and FIG. 16, in one embodiment of the suction device 1 according to the present application, the number of the suction nozzles 12 is four, and the load bearing region surrounded by the four suction nozzles 12 is rectangular. The shape of the load hearing region may be rectangular, and most of the substrates are cut into rectangles, which is favorable for the suction device 1 to suck the substrate. Of course, the load bearing region may be other shapes, provided it does not affect the movements of the suction nozzles 12 and the suction nozzles 12 can normally suck the substrate, which is not limited herein.

Optionally, in the present application, the number of the suction nozzles 12 is four, of which two suction nozzles 12 form a group, there are two groups in total, and the tour suction nozzles 12 form a rectangle. Thus, the substrate can be relatively sucked stably, and the number of the nozzles 12 is relatively small, which saves the cost. Of course, in other embodiments, the number of the suction nozzles 12 may also be other numbers of not less than three, provided the substrate can be sucked, which is not limited herein.

Figure 2:
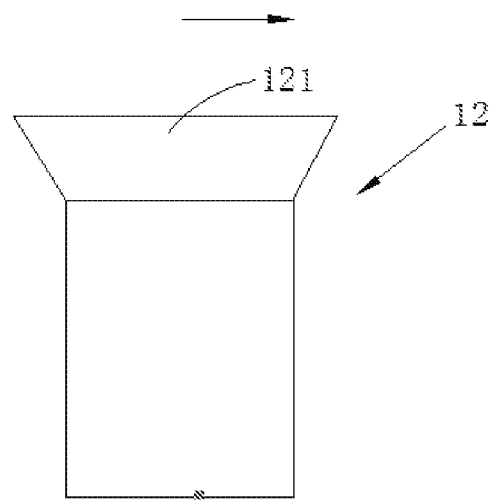
FIG. 2 is a schematic front view of a suction nozzle according to an embodiment of the present application.
Figure 3:
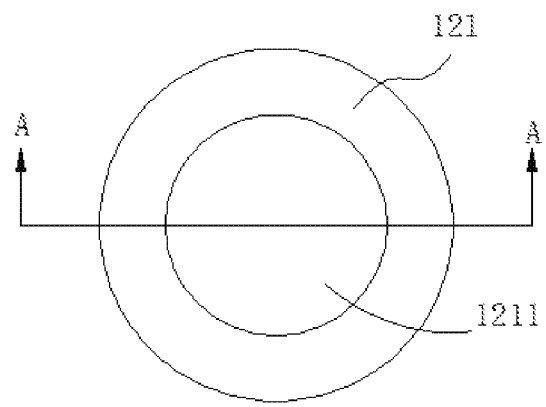
FIG. 3 is a first schematic top view of the suction nozzle according to an embodiment of the present application.
Figure 4:
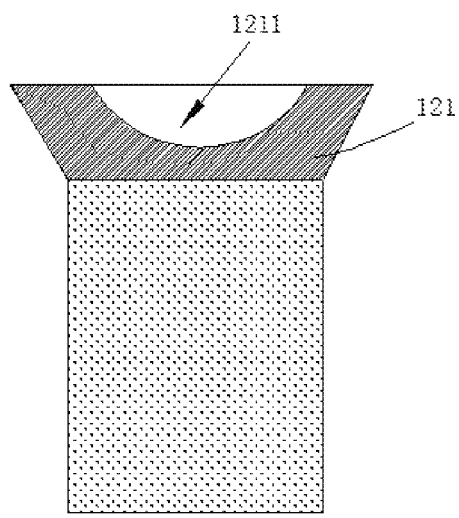
FIG. 4 is a cross-sectional view along the line A-A in FIG. 3.
Figure 5:
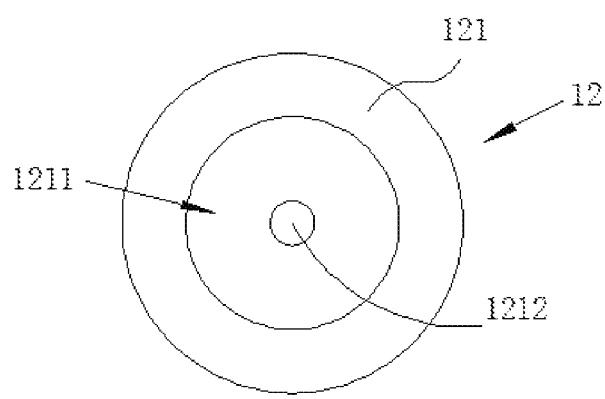
FIG. 5 is a second schematic top view of the suction nozzle according to an embodiment of the present application.

Further, please refer to FIG. 2 and FIG. 5, in one embodiment of the suction device 1 according to the present application, the suction device 1 further comprises:

an air suction device (not shown);

a suction tube (not shown) for transmitting gas to the air suction device, inlet hole 1212 being disposed on the suction nozzle 12, and the suction tube is being communication with the inlet hole 1212.

In this way, the gas passes through the inlet hole 1212 and enters the air suction device through the suction tube to generate suction force at the suction cups 121, which increases the suction strength between the suction cups 121 and the substrate while the suction cups 121 are in contact with the substrate.

Figure 6:
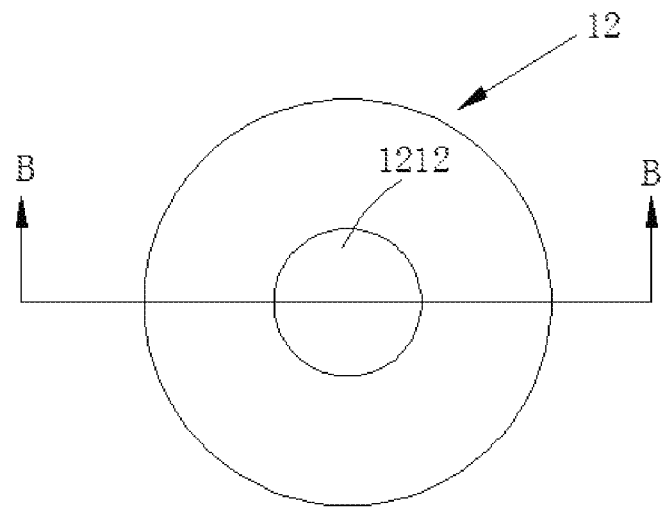
FIG. 6 is a third schematic top view of the suction nozzle according to an embodiment of the present application.
Figure 7:
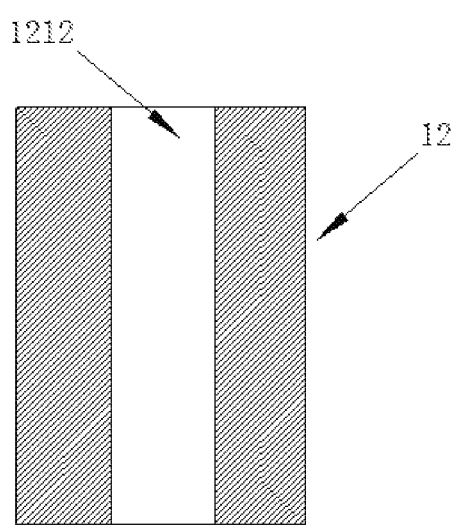
FIG. 7 is a cross-sectional view along the line B-B in FIG. 6.

Further referring to FIG. 6 and FIG. 7, the suction nozzles 12 is a hollow cylinder, wherein one end of the cylinder is in contact with the substrate, and a hollow tube of the cylinder serves as the inlet hole 1212. Of course, in other embodiments, provided the substrate can be sucked to the suction nozzles 12 by sucking gas into the inlet hole 1212, which is not limited herein.

Further, please refer to FIG. 2, in one embodiment of the suction device 1 according to the present application, the suction nozzles 12 are respectively provided with suction cups 121. In this way, the suction cups 121 can suck the substrate more firmly.

Further, please refer to FIG. 5, in one embodiment of the suction device 1 according to the present application, one end of the suction cup 121 is recessed inward to form a first chamber 1211, and the inlet hole 1212 is in communication with the first chamber 1211. In this way, the suction cup 121 is provided with a first chamber 1211, and part of the air in the first chamber 1211 will be squeezed out when the suction cup 121 is pressed on the substrate and in the state of deformation. During the transition from the pressed state to the stretched state between the suction cup 121 and the substrate, the air pressure in the first chamber 1211 is lower than the atmospheric pressure such that the suction cup 121 can be firmly held on the substrate by the atmospheric pressure, greatly enhancing the suction capacity between the suction cup 121 and the substrate. The inlet hole 1212 is in communication with the first chamber 1211, so that the gas in the first chamber 1211 can be further discharged to the air suction device through the inlet hole 1212, which further reduce the air pressure in the first chamber 1211, and increase the suction force between the suction cups 121 and the substrate.

Optionally, the suction cup 121 is made of an elastically deformable material. When the suction cup 121 is in contact with the substrate, the suction cup 121 would not damage the substrate and can serve as a buffer between the suction nozzle 121 and the substrate, reducing the probability of damage to the substrate from the suction nozzle 121. Optionally, the suction cup 121 has a suction surface, which facilitates the suction cup 121 sucking the substrate, enhancing the firmness of suction between the suction cup 121 and the substrate.

Further, please refer to FIG. 5, in one embodiment of the suction device 1 according to the present application, a side wall of the first chamber 1211 is provided with a vent hole (not shown and the vent hole is in communication with the inlet hole 1212. In this way, the gas in the first chamber 1211 sequentially passes through the air vent and the inlet 1212, and then enter the air suction device.

Optionally, please refer to FIG. 5, in one embodiment of the suction device 1 according to the present application, the inside surface of the first chamber 1211 is spherical. In this way, since the inside surface of the first chamber 1211 is a spherical structure, which could enhances the resilience of the suction cup 121 while the suction cup 121 sucks the substrate, and the enhanced resilience could increase the suction force of the suction cup 121.

Further, please refer to FIG. 12 to FIG. 15, in one embodiment of the suction device 1 according to the present application, the first end surface 112 is provided with a groove 111, the groove 111 is provided with a first wall (not shown), a second wall (not shown) opposite to the first wall, and a bottom (not shown) disposed to connect the first wall and the second wall; the first wall extends toward the inner side of the groove 111 and forms a first extension 1111, the second wall extends toward the inner side of the groove 111 and forms a second extension 1112, a slot 1113 is formed between the first extension 1111 and the second extension 1112, and the extending direction of the slot 1113 is the same as the extending direction of the groove 111;

a second chamber is defined by the groove 111, the first extension 1111 and the second extension 1112;

the suction nozzle 12 is provided with a fixing plate 124 adapted to the slot 1113, a sliding block 122 is provided in the second chamber and configured to slide along the groove 111, and the fixing plate 124 is arranged to pass through the slot 1113 and in fixed connection with the sliding block 122.

In this way, the sliding block 122 is configured to slide in the second chamber 1114, the suction nozzle 12 is fixed to the sliding block 122 by the fixing plate 124. The sliding block 122 is limited in the second chamber 1114 during the sliding movement and can slide along the extending direction of the groove 111, so that the suction nozzle 12 would not be detached from the substrate under the restriction of the sliding block 122, and the stability of the suction nozzle 12 during movement can be ensured.

Optionally, please refer to FIG. 12 to FIG. 15, in one embodiment of the suction device 1 according to the present application, the thickness of the fixing plate 124 is the same as the width of the slot 113. The sliding block 122 can be prevented from being detached from the second chamber 114 during the sliding process. Please refer to FIG. 13, the area where the sliding block 122 can be shaken is limited in the internal space of the second chamber 1114. If the cross-sectional area of the second chamber 1114 and the cross-sectional area of the sliding block 122 are the same, then the sliding block 122 would not be shaking during operation. In the meantime, when one end of the suction nozzle 12 for sucking the substrate sucks the substrate downward, the pressure from the suction nozzle 12 will be exerted on the first extension 1111 and the second extension 1112, that is, the first extension 1111 and the second extension 1112 also serve as a support in this case.

Optionally, please refer to FIG. 2 to FIG. 5, in one embodiment of the suction device 1 according to the present application, cross section of the second chamber 114 is rectangular. In this way, the sliding block 122 would not easily be shaking when the sliding block 122 is sliding in the second chamber 1114.

Further, please refer to FIG. 12 to FIG. 15, in one embodiment of the suction device 1 according to the present application, balls 123 are disposed between the sliding block 122 and the groove 111. In this way, when the sliding block 122 is sliding in the second chamber 1114, the balls 123 greatly reduce the friction between the inner wall of the second chamber 1114 and the sliding block 122. Optionally, the balls 123 is movably connected to the sliding block 122.

Further, please refer to FIG. 12 to FIG. 15, in one embodiment of the suction device 1 according to the present application, wherein comprising a plurality of balls 123, and the plurality of balls 123 are evenly distributed between the sliding block 122 and the bottom. In this way, when the sliding block 122 slides in the second chamber 1114, the balls 123 evenly distributed between the sliding block 122 and the bottom, which can avoid the vibration of the sliding block 122.

Figure 8:
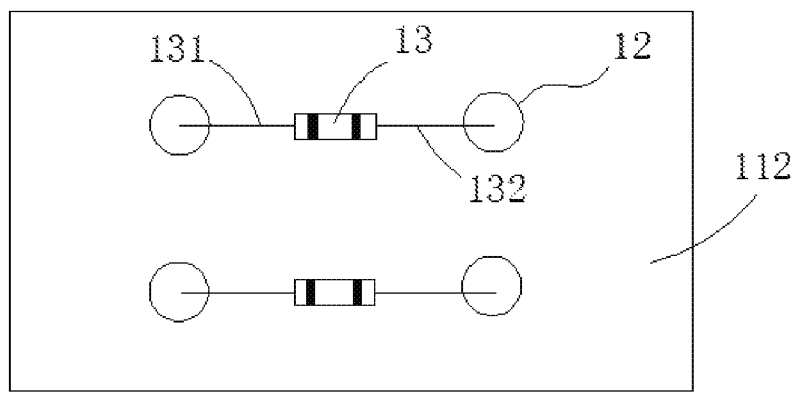
FIG. 8 is an extended schematic view of a double-acting cylinder with double pistons of the suction device according to an embodiment of the present application.
Figure 9:
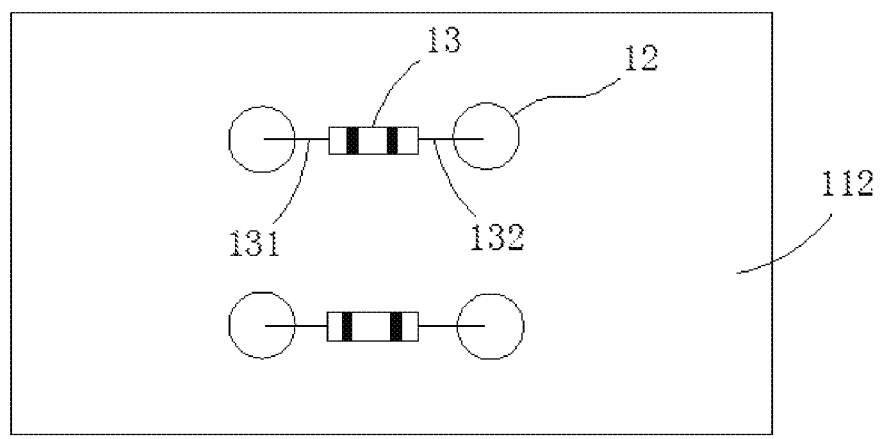
FIG. 9 is a contracted schematic view of the double-acting cylinder with double pistons of the suction device according to an embodiment of the present application.
Figure 12:
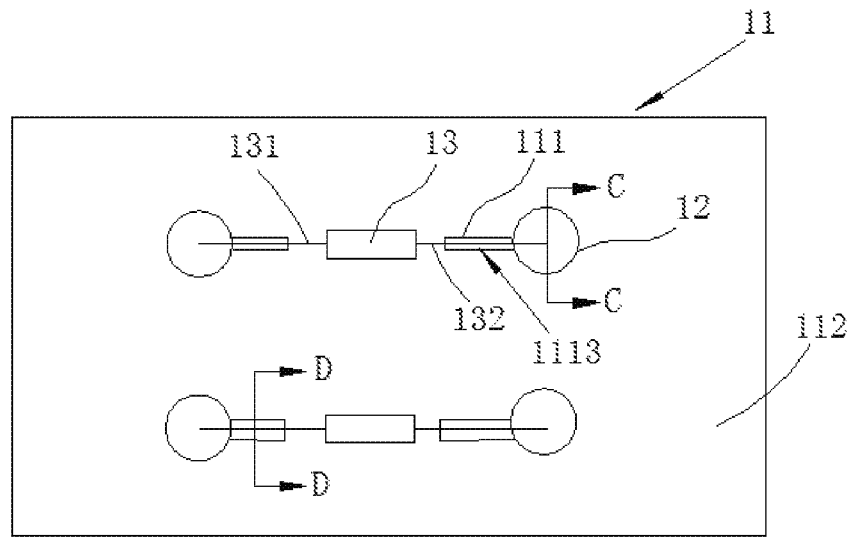
FIG. 12 is a second schematic front view of a suction device according to an embodiment of the present application.
Figure 13:
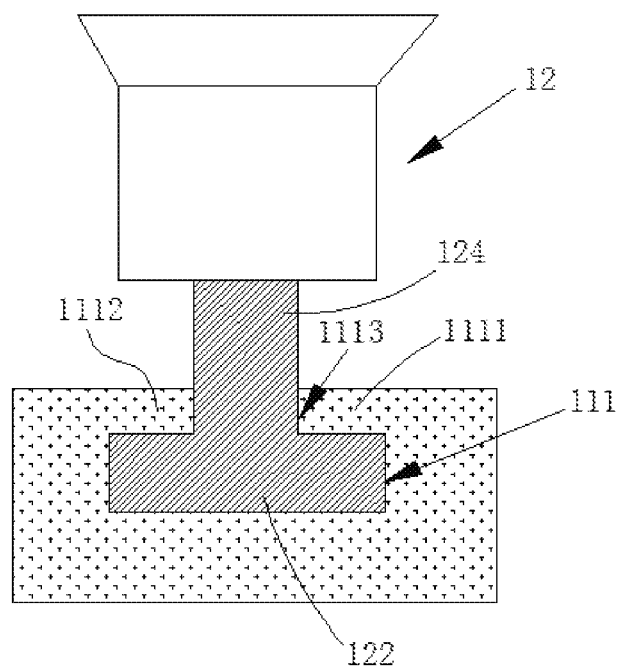
FIG. 13 is a first cross-sectional view along the line C-C in FIG. 12.
Figure 14:
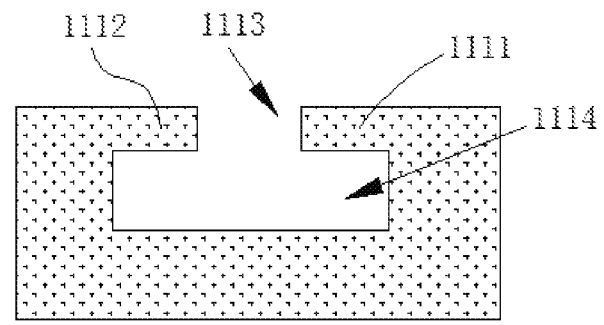
FIG. 14 is a cross-sectional view along the line D-D in FIG. 12.
Figure 15:
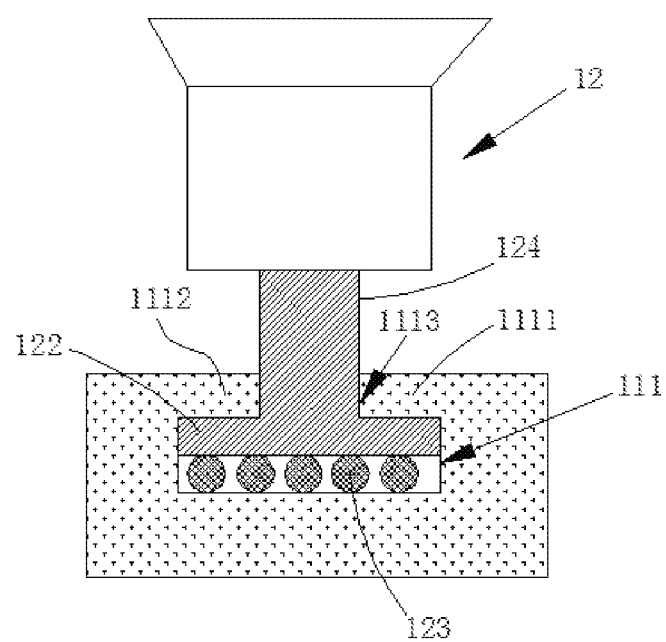
FIG. 15 is a second cross-sectional view along the line C-C in FIG. 12.

Further, please refer to FIG. 8, FIG. 9 or FIG. 12, in one embodiment of the suction device 1 according to the present application, the driving assembly is a double-acting cylinder 13 with double pistons, the double-acting cylinder 13 is provided with a first telescopic end 131 and a second telescopic end 132 which are configured to extend and telescope independently or synchronously, the first telescopic end 131 is provided with one of the suction nozzles 12 and/or the second telescopic end 132 is provided with one of the suction nozzles 12.

Figure 10:
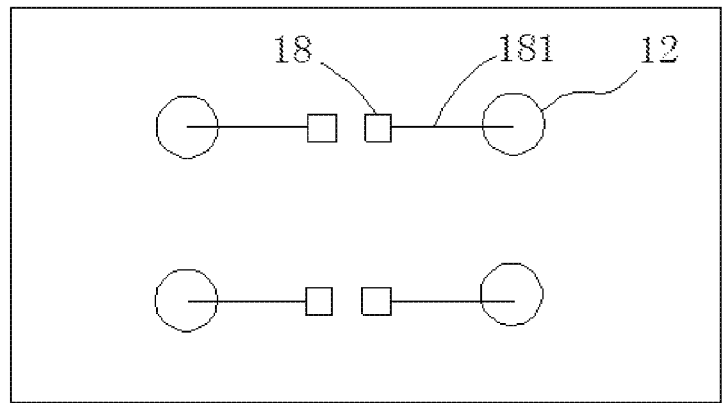
FIG. 10 is an extended schematic view of a unidirectional telescopic cylinder of the suction device according to an embodiment of the present application.
Figure 11:
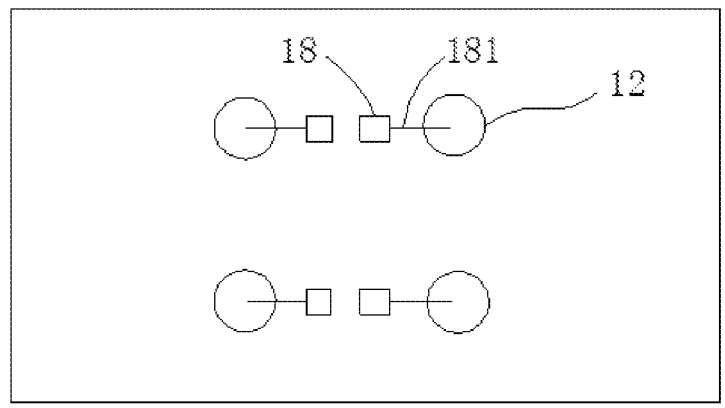
FIG. 11 is a contracted schematic view of a unidirectional telescopic cylinder of the suction device according to an embodiment of the present application.

In this way, in this embodiment, the double-acting cylinder 13 can control the movements of the two suction nozzles 12 at the same time, thereby saving the cost. Of course, in other embodiments, referring to FIG. 10 or FIG. 11, there may be a plurality of unidirectional telescopic cylinders 18, the unidirectional telescopic cylinder 18 is provided with a fourth telescopic end 181. Therefore, each of the suction nozzles 12 can be individually controlled.

In this embodiment, the suction nozzle 12 is fixed to the first telescopic end 131 and/or the second telescopic end 132 of the double-acting cylinder 13 and controls the movement of the first telescopic end 131 and/or the second telescopic end 132 through the double-acting cylinder 13, which can effectively control the position of the suction nozzle 12. The control process is also very simple and facilitates the production.

Figure 16:
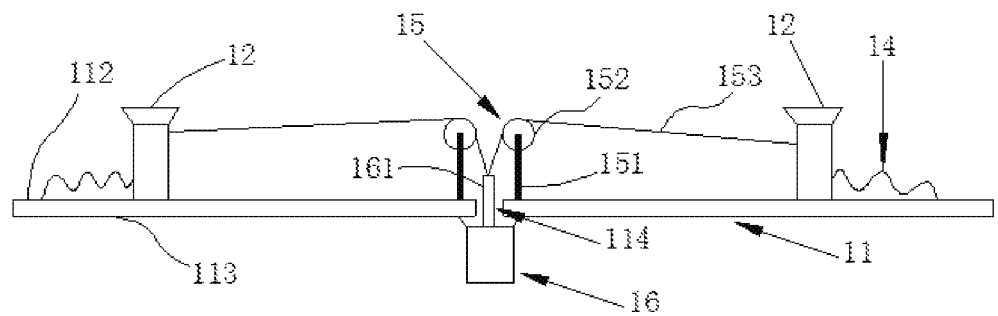
FIG. 16 is a third schematic front view of a suction device according to an embodiment of the present application.

Further, please refer to FIG. 16, in one embodiment of the suction device 1 according to the present application, the suction device 1 further comprises a return spring 14, one end of the return spring 14 is in fixed connection with the suction nozzle 12, and the other end of the return spring 14 is fixed to the base 11.

In this way, the return spring 14 can make the displaced suction nozzle 12 return to its original position without additional equipment, which is simple in structure, convenient in manufacture and low in cost. In this embodiment, the return spring 14 is fixed to the base 11. In other embodiments, please refer to FIG. 17, FIG. 19 or FIG. 21, which are respectively taken as one embodiment of the suction device 1 provided according to the present application. A fixing column 19 may also be disposed on the base 11. One end of the return spring 14 is fixed to the fixing column 19, and the other end of the return spring 14 is fixed to the suction nozzle 12. Optionally, the return spring 14 is parallel to the first end surface 112. Therefore, during the operation of the suction nozzle 12, there would not generate a force for pressing the suction nozzle 12 against the first end surface 112 due to an angle between the return spring 14 and the first end surface 112, reducing the friction between the suction nozzle 12 and the first end surface 112. In other embodiments, the direction in which the return spring 14 extends is parallel to the groove 111. Therefore, a force as applied by the return spring 14 against the suction nozzle 12 in the width direction of the slot 1113 can be avoided, thereby reducing the friction between the suction nozzle 12 and the base 11.

Further, please refer to FIG. 2 and FIG. 5, in one embodiment of the suction device 1 according to the present application, the driving assembly is disposed in the extending direction of the return spring 14. In this embodiment, the driving assembly is disposed in the extending direction of the return spring 14, which is beneficial for the return spring 14 to pull the suction nozzle 12 back to the starting position, where the starting position means the position of the suction nozzle 12 before the driving assembly changes the load hearing region.

Figure 17:
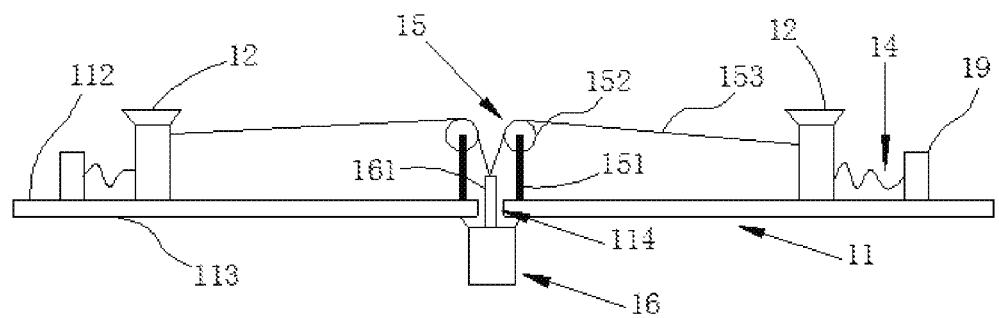
FIG. 17 is a fourth schematic front view of a suction device according to an embodiment of the present application.

Further, please refer to FIG. 16 or FIG. 17, in one embodiment of the suction device 1 according to the present application, the suction device 1 further comprises a first pulling wire 153 for pulling the suction nozzle 12, the base 11 defines an opening 114, a first end surface 112 of an edge of the opening 114 is provided with fixed pulley devices 15 configured to change the pulling directions of first pulling wires 153, wherein the number of the fixed pulley devices 15 corresponds to the number of the suction nozzles 12; each fixed pulley device 15 comprises a support 115 fixed to the first end surface 112 and a pulley 152 fixed to the support 115 and rotatably connected to the support 151, and the pulley 152 is provided with a wire slot for accommodating the pulling wire 153; and a unidirectional cylinder 16 which is fixed to a second end surface 113 of the base 11, the second end surface 113 is opposite to the first end surface 112, the unidirectional cylinder 16 is provided with a third telescopic end 161 extending toward the first end surface 112, the third telescopic end 161 is arranged to pass through the opening 114, and the distance between the third telescopic end 161 in an extended state and the first end surface 112 is less than the distance between the pulley 152 and the first end surface 112;

one end of the first pulling wire 153 is in fixed connection with the suction nozzle 12, the other end of the first pulling wire 153 is in fixed connection with the third telescopic end 161, the first pulling wire 153 is engaged in the wire slot, and the first pulling wire 153 is slidingly connected with the pulley 152.

In this way, the pulley 152 on the fixed pulley device 15 serves to change the pulling direction of the first pulling wire 153. When the third telescopic end 161 is extended, the return spring 14 is contracted. The return spring 14 pulls the suction nozzle 12 and the first pulling wire 153 to move toward the contracted direction of the return spring 14, so as to expand the load bearing region defined by the suction nozzles 12. When the third telescopic end 161 is contracted, the third telescopic end 161 pulls the first pulling wire 153 to move toward the third telescopic end 161. At the same time, the suction nozzle 12 moves along the groove 111 towards the pulley 152 under the pulling of the first pulling wire 153, so as to reduce the load bearing region defined by the suction nozzles 12.

One unidirectional cylinder 16 can simultaneously control the movements of a plurality of suction nozzles 12, reducing the number of cylinders required.

The third telescopic end 161 is arranged to pass through the opening 114, and the distance between the third telescopic end 161 in an extended state and the first end surface 112 is less than the distance between the pulley 152 and the first end surface 112, which makes the first pulling wire 153 connected to the suction nozzle 12 and the third telescopic end 161 will always be abutted on the pulley 152 regardless of whether the third telescopic end 161 is extended or contracted.

Figure 20:
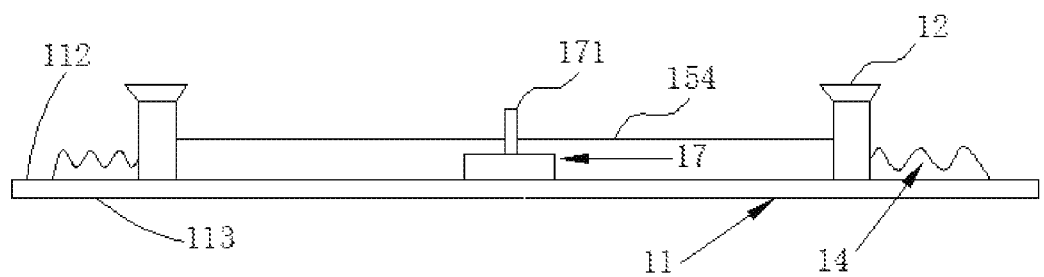
FIG. 20 is a seventh schematic front view of a suction device according to an embodiment of the present application.
Figure 21:
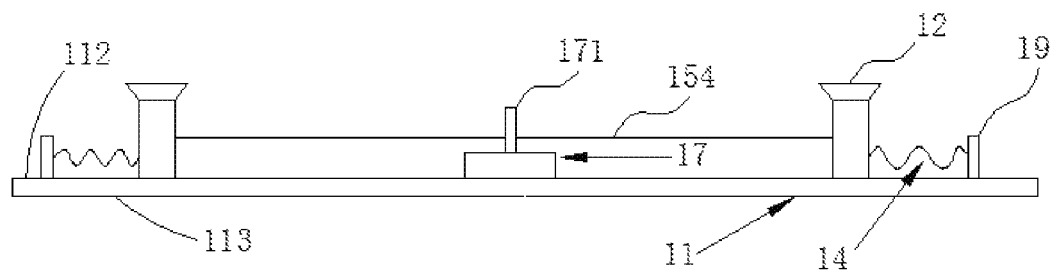
FIG. 21 is an eighth schematic front view of a suction device according to an embodiment of the present application.

Further, please refer to FIG. 20 to FIG. 21, in one embodiment of the suction device 1 according to the present application, the suction device 1 further comprises a second pulling wire 154, wherein an electric motor 17 is fixed to the first end surface 112 at the load hearing region, and the electric motor 17 is provided with a rotating shaft 171 extending toward the outside of the first end surface 112, the rotating shaft 171 is perpendicular to the first end surface 112, one end of the second pulling wire 154 is in fixed connection with the suction nozzle 12, and the other end of the second pulling wire 154 is in fixed connection with the surface of the rotating shaft 171.

In this way, the second pulling wire 154 is fixed to the surface of the rotating shaft 171. In the initial position, where the second pulling wire 154 is not wound on the rotating shaft 171, the rotating shaft 171 can rotate in any direction. Assuming that the initial rotation direction is the counterclockwise rotation direction and when the second pulling wire 154 starts to be wound on the rotation shaft 171, the return spring 14 is stretched and the load bearing region is reduced; when the rotational direction of the rotating shaft 171 changes from the counterclockwise direction to the clockwise direction, the return spring 14 contracts and the load bearing region increases. Similarly, in the initial position, assuming that the initial rotation direction is the clockwise rotation direction and when the second pulling wire 154 starts to be wound on the rotation shaft 171, the return spring 14 is stretched and the load bearing region is reduced; when the rotational direction of the rotating shaft 171 changes from the clockwise direction to the counterclockwise direction, the return spring 14 contracts and the load bearing region increases.

In this embodiment, one electric motor 17 can control the movements of a plurality of suction nozzles 12, that is, the electric motor 17 controls the expansion and contraction of the area of the load bearing region. At the same time, the rotating shaft 171 can control the movement of the suction nozzle 12 continuously over a wide range by rotating different angles, and it is very convenient to change the load bearing region.

Further, please refer to FIG. 20 to FIG. 21, in one embodiment of the suction device 1 according to the present application, the second pulling wire 154 is parallel to the first end surface 112. In this way, the second pulling wire 154 will only be subjected to a force parallel to the first end surface 112 during the movement of the suction nozzle 12, which can avoid, in the direction perpendicular to the first end surface 112, increasing the resistance due to the suction nozzle 12 approaching and abutting on the first end surface 112, and affecting the suction stability of the suction nozzle 12 to the substrate due to the excessive distance between the suction nozzle 12 and the first end surface 112 when the suction nozzle 12 is far away from the first end surface 112.

Figure 19:
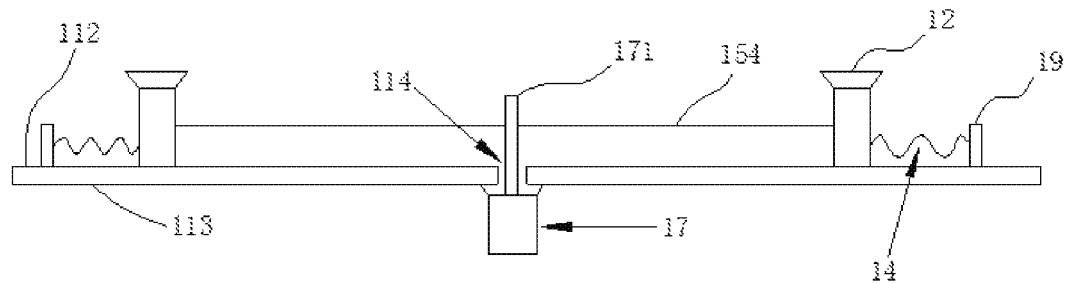
FIG. 19 is a sixth schematic front view of a suction device according to an embodiment of the present application.

Further, please refer to FIG. 19, in one embodiment of the suction device 1 according to the present application, the base 11 is provided with the fixing column 19, one end of the return spring 14 is fixed to the fixing column 19, and the other end of the return spring 14 is connected to the suction nozzle 12, the suction device 1 further comprises a second pulling wire 154, an electric motor 17 is fixed to the second end surface 113, and the electric motor 17 has a rotation shaft 171, wherein the rotation shaft 171 is arranged to pass through the opening 114. One end of the second pulling wire 154 is in fixed connection with the suction nozzle 12, and the other end of the second pulling wire 154 is in fixed connection with the surface of the rotating shaft 171.

Figure 18:
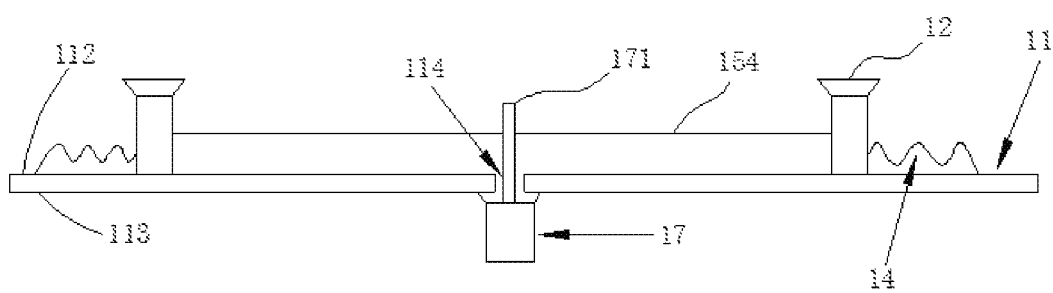
FIG. 18 is a fifth schematic front view of a suction device according to an embodiment of the present application.

In this way, the electric motor 17 does not occupy the space of the first end surface 112 and avoids the situation where the electric motor 17 may collide and damage the substrate. The second pulling wire 154 is fixed to the surface of the rotating shaft 171. In the initial position, where the second pulling wire 154 is not wound on the rotating shaft 171, the rotating shaft 171 can rotate in any direction. Assuming that the initial rotation direction is the counterclockwise rotation direction and when the second pulling wire 154 starts to be wound on the rotation shaft 171, the return spring 14 is stretched and the load bearing region is reduced; when the rotational direction of the rotating shaft 171 changes from the counterclockwise direction to the clockwise direction, the return spring 14 contracts and the load bearing region increases. Similarly, in the initial position, assuming that the initial rotation direction is the clockwise rotation direction and when the second pulling wire 154 starts to be wound on the rotation shaft 171, the return spring 14 is stretched and the load bearing region is reduced; when the rotational direction of the rotating shaft 171 changes from the clockwise direction to the counterclockwise direction, the return spring 14 contracts and the load bearing region increases. Of course, in FIG. 18, one end of the spring is directly fixed to the first end surface 112.

In this embodiment, one electric motor 17 can control the movements of a plurality of suction nozzles 12, that is, the electric motor 17 controls the expansion and contraction of the area of the load bearing region. At the same time, the rotating shaft 171 can control the movement of the suction nozzle 12 continuously over a wide range by rotating different angles, and it is very convenient to change the load bearing region.

Please refer to FIG. 1 to FIG. 4, FIG. 8, FIG. 9 and FIG. 16, the present application further provides a suction system (not shown), which comprises a robotic manipulator (not shown) and the suction device 1, wherein the robotic manipulator is provided with a gripper (not shown) for gripping an object, and base 11 is fixed to the gripper.

The suction system provided by the present application has the following effects: since the aforementioned suction device 1 is adopted, the first end surface 112 of the suction device 1 of the present application is provided with suction nozzles 12, which are movably connected to the first end surface 112. The number of the suction nozzles 12 is not less than three, a load bearing region is defined by the suction nozzles 12, and the suction nozzles 12 may adjust the area of the load bearing region under the driving of the driving assembly. In this way, when the substrate to be sucked generates a displacement or offset resulting in that the suction nozzles 12 cannot be sucked to the substrate, the suction nozzles 12 can be moved to a new position to suck the substrate.

Optionally, the gripper has at least one degree of freedom. In this way, the gripper can grasp the base 11 with great flexibility and transfer the base 11.

Please refer to FIG. 1 to FIG. 4, FIG. 8, FIG. 9 and FIG. 16, the present application further provides a handling equipment (not shown), which comprises a guide rail, a mover slidingly disposed to the guide rail and a suction system, wherein the robotic manipulator is fixed to the mover.

The handling equipment provided by the present application has the following effects: since the aforementioned suction system is adopted, the first end surface 112 of the suction device 1 of the present application is provided with suction nozzles 12, which are movably connected to the first end surface 112. The number of the suction nozzles 12 is not less than three, a load bearing region is defined by the suction nozzles 12, and the suction nozzles 12 may adjust the area of the load bearing region under the driving of the driving assembly. In this way, when the substrate to be sucked generates a displacement or offset resulting in that the suction nozzles 12 cannot be sucked to the substrate, the suction nozzles 12 can be moved to a new position to suck the substrate. In this embodiment, wherein robotic manipulator is fixed to the mover, so that the mover can move the robotic manipulator along the guide rail, which is very convenient.

The aforementioned embodiments are only preferred embodiments of the present application, and are not intended to limit the present application. Any modification, equivalent replacement, improvement, and so on, which are made within the spirit and the principle of the present application, should be included in the scope of the present application.

The invention claimed is:

1. A suction device, comprising:
   a base having a first end surface;
   at least three suction nozzles disposed on the first end surface, wherein a load bearing region is defined by the at least three suction nozzles;
   a driving assembly configured to adjust the area of the load bearing region, wherein the driving assembly is fixed to the base;
   wherein, the first end surface is provided with a groove, the groove is provided with a first wall, a second wall opposite to the first wall, and a bottom connecting the first wall with the second wall; the first wall extends toward an inner side of the groove and forms a first extension, the second wall extends toward the inner side of the groove and forms a second extension, a slot is formed between the first extension and the second extension, and an extending direction of the slot is same as an extending direction of the groove;
   a second chamber is defined by the groove, the first extension and the second extension; and
   the suction nozzle is provided with a fixing plate adapted to the slot, a sliding block is provided in the second chamber and configured to slide along the groove, and the fixing plate is arranged to pass through the slot and in fixed connection with the sliding block.

2. A suction device of claim 1, wherein the number of the suction nozzles is four, and the load bearing region surrounded by the four suction nozzles is rectangular.

3. A suction device of claim 1, further comprising:
   an air suction device;
   a suction tube for transmitting gas to the air suction device, inlet hole being disposed in the suction nozzles, and the suction tube being in communication with the inlet hole.

4. A suction device of claim 3, wherein the suction nozzles are respectively provided with suction cups.

5. A suction device of claim 4, wherein one end of the suction cup is recessed inward to form a first chamber, and the inlet hole is in communication with the first chamber.

6. A suction device of claim 5, wherein a side wall of the first chamber is provided with a vent hole, and the vent hole is in communication with the inlet hole.

7. A suction device of claim 5, wherein an inside surface of the first chamber is spherical.

8. A suction device of claim 1, wherein the thickness of the fixing plate is equal to the width of the slot.

9. A suction device of claim 1, wherein the cross section of the second chamber is rectangular.

10. A suction device of claim 1, wherein balls are disposed between the sliding block and the inner wall of the groove.

11. A suction device of claim 10, comprising a plurality of balls, and the plurality of balls are evenly distributed between the sliding block and the bottom.

12. A suction device of claim 1, wherein the driving assembly is a double-acting cylinder with double pistons, the double-acting cylinder is provided with a first telescopic end and a second telescopic end which are configured to extend and telescope independently or synchronously, wherein the first telescopic end is provided with one of the suction nozzles and/or the second telescopic end is provided with one of the suction nozzles.

13. A suction device of claim 1, further comprising a return spring, one end of the return spring is in fixed connection with the suction nozzle, and the other end of the return spring is fixed to the base.

14. A suction device of claim 13, wherein the driving assembly is disposed in the extending direction of the return spring.

15. A suction device of claim 13, further comprising a first pulling wire for pulling the suction nozzle, the base defines an opening, a first end surface of an edge of the opening is provided with fixed pulley devices configured to change the pulling directions of first pulling wires, wherein the number of the fixed pulley devices corresponds to the number of the suction nozzles; each fixed pulley device comprises a support fixed to the first end surface and a pulley fixed on the support and rotatably connected to the support, and the pulley is provided with a wire slot for accommodating the pulling wire; and a unidirectional cylinder which is fixed to a second end surface of the base, the second end surface is opposite to the first end surface, the unidirectional cylinder is provided with a third telescopic end extending toward the first end surface, the third telescopic end is arranged to pass through the opening, and the distance between the third telescopic end in an extended state and the first end surface is less than the distance between the pulley and the first end surface;

one end of the first pulling wire is in fixed connection with the suction nozzle, the other end of the first pulling wire is in fixed connection with the third telescopic end, the first pulling wire is engaged in the wire slot, and the first pulling wire is slidingly connected with the pulley.

16. A suction device of claim 13, further comprising a second pulling wire, wherein an electric motor is fixed to the first end surface at the load bearing region, and the electric motor is provided with a rotating shaft extending toward the outside of the first end surface, the rotating shaft is perpendicular to the first end surface, one end of the second pulling wire is in fixed connection with the suction nozzle, and the other end of the second pulling wire is in fixed connection with the surface of the rotating shaft.

17. A suction device of claim 16, wherein the second pulling wire is parallel to the first end surface.

* * * * *

UNITED STATES PATENT AND TRADEMARK OFFICE
CERTIFICATE OF CORRECTION

| | |
|---|---|
| PATENT NO. | : 10,889,006 B2 |
| APPLICATION NO. | : 15/745064 |
| DATED | : January 12, 2021 |
| INVENTOR(S) | : Wei Wu |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 111 days.

Signed and Sealed this
Thirty-first Day of January, 2023

Katherine Kelly Vidal
*Director of the United States Patent and Trademark Office*